United States Patent
Morita et al.

(10) Patent No.: US 9,300,518 B2
(45) Date of Patent: Mar. 29, 2016

(54) PULSE RADAR DEVICE AND CONTROL METHOD THEREFOR

(71) Applicant: Panasonic Intellectual Property Management Co., Ltd., Osaka (JP)

(72) Inventors: Tadashi Morita, Kanagawa (JP); Takaaki Kishigami, Tokyo (JP); Naoya Yosoku, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/702,235

(22) Filed: May 1, 2015

(65) Prior Publication Data
US 2015/0341203 A1 Nov. 26, 2015

(30) Foreign Application Priority Data
May 23, 2014 (JP) .................................. 2014-107295

(51) Int. Cl.
| | |
|---|---|
| H04L 27/00 | (2006.01) |
| H04L 27/18 | (2006.01) |
| H04L 27/20 | (2006.01) |
| H04L 27/38 | (2006.01) |
| H04J 13/00 | (2011.01) |
| G01S 7/288 | (2006.01) |
| G01S 13/28 | (2006.01) |

(52) U.S. Cl.
CPC ............. *H04L 27/3863* (2013.01); *G01S 7/288* (2013.01); *G01S 13/288* (2013.01); *H04J 13/0014* (2013.01); *H04L 27/205* (2013.01); *G01S 2007/2886* (2013.01)

(58) Field of Classification Search
USPC ......... 375/219, 220, 221, 222, 223, 238, 239, 375/240, 240.02, 240.26, 240.27, 241, 242, 375/253, 254, 246, 244, 245, 259, 260, 269, 375/271, 273, 274, 275, 279, 280, 283, 284, 375/285, 295, 302, 308, 309, 312, 316, 322, 375/323, 324, 329, 340, 346
See application file for complete search history.

(56) References Cited

U.S. PATENT DOCUMENTS

| | | |
|---|---|---|
| 5,705,958 A | 1/1998 | Janer |
| 2007/0113159 A1 | 5/2007 | Lakkis |

(Continued)

FOREIGN PATENT DOCUMENTS

JP  2012-060569  3/2012

OTHER PUBLICATIONS

Extended European Search Report dated Oct. 23, 2015, for corresponds EP Application No. 15166721.9-1812, 8 pages.

(Continued)

*Primary Examiner* — Linda Wong
(74) *Attorney, Agent, or Firm* — Seed IP Law Group PLLC

(57) ABSTRACT

A transmission system is provided with a pulse sequence generator that generates a pulse sequence including Golay code or Spano code, a $\pi/2$-BPSK modulator that applies $\pi/2$-BPSK modulation to the pulse sequence generated by the pulse sequence generator, and a phase rotator that provides phase rotation for every pulse for output of the $\pi/2$-BPSK modulator and a reception system is provided with a phase rotator that provides a phase opposite to a phase provided by the phase rotator of the transmission system and a correlator that performs correlation calculation for output of the phase rotator, based on the output of the $\pi/2$-BPSK modulator.

9 Claims, 14 Drawing Sheets

(56) References Cited

U.S. PATENT DOCUMENTS

| | | |
|---|---|---|
| 2013/0135140 A1 | 5/2013 | Kishigami et al. |
| 2013/0163656 A1 | 6/2013 | Sakamoto |
| 2014/0022930 A1* | 1/2014 | Trachewsky ........ H04L 27/0012 370/252 |

OTHER PUBLICATIONS

Kishigami et al.,"Advanced Millimeter-Wave Radar System to Detect Pedestrians and Vehicles by Using Coded Pulse Compression and Adaptive Array", IEICE Transactions on Communications, Communications Society, Tokyo, JP, vol. E96-B (9), Sep. 1, 2013, pp. 2313-2322 (10 pages).

Takase et al.,"A Dual-use Radar and Communication System with Complete Complementary Codes", 2014 15TH International Radar Symposium (IRS), Warsaw University of Technology (WUT), Jun. 16, 2014, 4 pages.

* cited by examiner

A = {+1, −1, ⋯}
π/2 ROTATION FOR EVERY SUB-PULSE

| NO. | PULSE | AMOUNT OF PHASE ROTATION IN TRANSMISSION SYSTEM | AMOUNT OF PHASE ROTATION IN RECEPTION SYSTEM |
|---|---|---|---|
| 1 | A | 0 | 0 |
| 2 | B | 0 | 0 |
| 3 | B' | 0 | 0 |
| 4 | A' | 0 | 0 |
| 5 | B | π | −π |
| 6 | A | π | −π |
| 7 | A' | π | −π |
| 8 | B' | π | −π |

FIG. 4

A, B,　B', A',　B, A,　A', B'　　A = {+1, −1, ⋯}
⏟　　⏟　　⏟　　⏟　　π/2 ROTATION FOR
0　　π/2　　π　　3π/2　　EVERY SUB-PULSE

| NO. | PULSE | AMOUNT OF PHASE ROTATION IN TRANSMISSION SYSTEM | AMOUNT OF PHASE ROTATION IN RECEPTION SYSTEM |
|---|---|---|---|
| 1 | A | 0 | 0 |
| 2 | B | 0 | 0 |
| 3 | B' | π/2 | −π/2 |
| 4 | A' | π/2 | −π/2 |
| 5 | B | π | −π |
| 6 | A | π | −π |
| 7 | A' | 3π/2 | −3π/2 |
| 8 | B' | 3π/2 | −3π/2 |

FIG. 6

PROCESSING IN TRANSMISSION SYSTEM

| SUB-PULSE NO. | TRANSMISSION INFORMATION | MAPPING | PROVIDED PHASE ROTATION | TRANSMISSION SIGNAL |
|---|---|---|---|---|
| 1 | 1 | (1, 0) | 0 | (1, 0) |
| 2 | −1 | (0, −1) | π | (0, −1) |
| 3 | 1 | (−1, 0) | 0 | (−1, 0) |
| 4 | 1 | (0, −1) | 0 | (0, −1) |
| 5 | −1 | (−1, 0) | π | (1, 0) |
| 6 | −1 | (0, −1) | π | (0, 1) |
| 7 | −1 | (1, 0) | π | (−1, 0) |
| 8 | 1 | (0, −1) | 0 | (0, −1) |

PROCESSING IN RECEPTION SYSTEM

| SUB-PULSE NO. | RECEPTION SIGNAL | PROVIDED PHASE ROTATION | DEMAPPING | OBTAINED CODE INFORMATION |
|---|---|---|---|---|
| 1 | (1, 0) | 0 | (1, 0) | 1 |
| 2 | (0, 1) | π | (0, −1) | −1 |
| 3 | (−1, 0) | 0 | (−1, 0) | 1 |
| 4 | (0, −1) | 0 | (0, −1) | 1 |
| 5 | (1, 0) | π | (−1, 0) | −1 |
| 6 | (0, 1) | π | (0, −1) | −1 |
| 7 | (−1, 0) | π | (1, 0) | −1 |
| 8 | (0, −1) | 0 | (0, −1) | 1 |

DIFFERENT RF ERRORS ARE MIXED
FOR EACH SUB-PULSE
(FOR ODD-NUMBERED SUB-PULSES
AND EVEN-NUMBERED SUB-PULSES)

DIFFERENT RF ERRORS ARE MIXED
FOR EACH SUB-PULSE
(FOR ODD-NUMBERED SUB-PULSES
AND EVEN-NUMBERED SUB-PULSES)

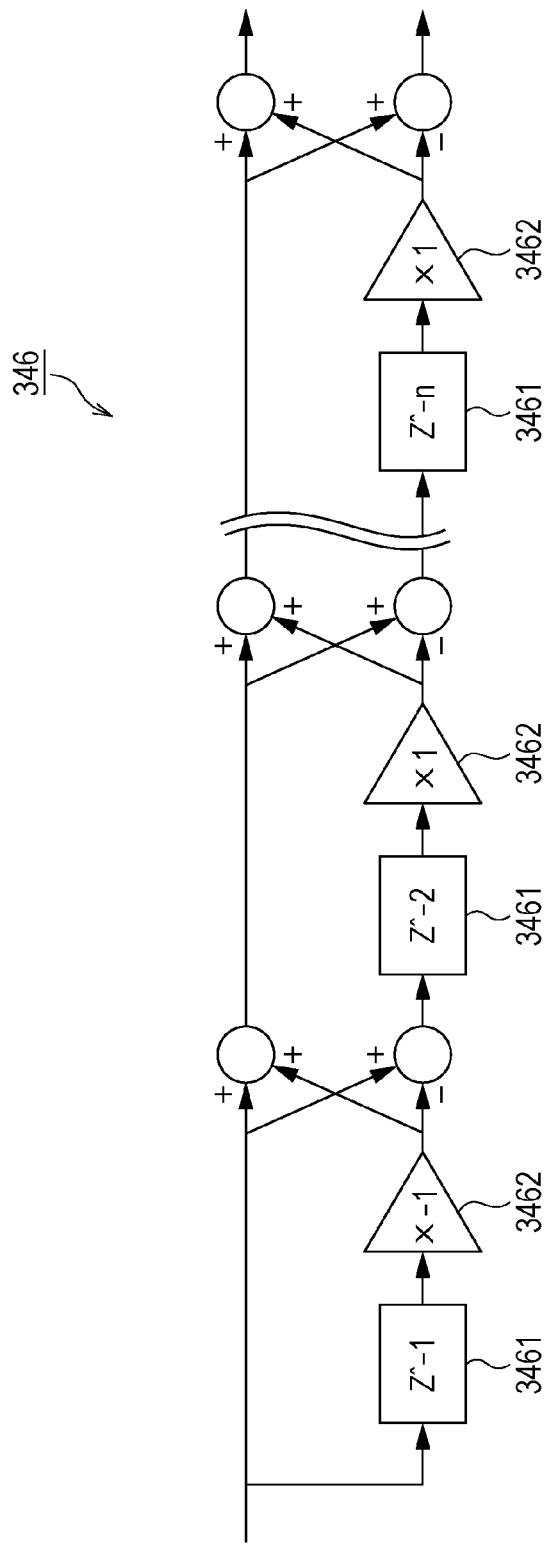

PULSE RADAR DEVICE AND CONTROL METHOD THEREFOR

BACKGROUND

1. Technical Field

The present disclosure relates to a pulse radar device in which π/2 binary phase-shift keying (BPSK) modulation scheme is used.

2. Description of the Related Art

When RF (radio-frequency) errors occur in a radio processor (RF unit) including a high-frequency unit in a communication device or a radar device in which a conventional π/2-BPSK modulation scheme is used, the RF errors are reduced by performance of a training in advance as in an orthogonal error correction method disclosed in Japanese Unexamined Patent Application Publication No. 2012-060569 and transition to normal operation mode is thereafter made.

SUMMARY

In the related art, IQ error as one of the RF errors in orthogonal signals (IQ signals) that are inputted into the radio processor is reduced by an IQ error correction circuit. Correction parameters that are used in the IQ error correction circuit are calculated in a training period. Due to those facts, the related art has a problem in that addition of the IQ error correction circuit and addition of procedures for obtainment of the correction parameters for the IQ error correction circuit cause cost increase.

One non-limiting and exemplary embodiment provides a pulse radar device that produces transmission signals for reducing the RF errors without addition of a circuit that finds out parameters for correcting the RF errors in advance and a control method for the pulse radar device.

In one general aspect, the techniques disclosed here feature a pulse radar device including a pulse sequence generator that generates a pulse sequence with use of two sub-pulse sequences which are complementary codes, a π/2-BPSK modulator that generates modulation signals resultant from π/2-BPSK modulation of the sub-pulses of the sub-pulse sequences, a first phase rotator that provides phase rotation by a first phase for the modulation signals for every specified number of pulses, and a radio transmitter that transmits the modulation signals having undergone the phase rotation, in a transmission system, wherein the two sub-pulse sequences include a first sub-pulse sequence and a second sub-pulse sequence, and sum of total of odd-numbered terms of correlation calculation value between the first sub-pulse sequence and the first sub-pulse sequence having a specified timing deviation and total of odd-numbered terms of correlation calculation value between the second sub-pulse sequence and the second sub-pulse sequence having the specified timing deviation is zero and sum of total of even-numbered terms of the correlation calculation value between the first sub-pulse sequence and the first sub-pulse sequence having the specified timing deviation and total of even-numbered terms of correlation calculation value between the second sub-pulse sequence and the second sub-pulse sequence having the specified timing deviation is zero.

It should be noted that general or specific embodiments may be implemented as a system, a method, an integrated circuit, a computer program, a storage medium, or any selective combination thereof.

According to the disclosure, the pulse radar device that produces the transmission signals for reducing the RF errors without the addition of the circuit that finds out the parameters for correcting the RF errors in advance can be provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating phase rotation in a pulse radar device according to embodiment 2;

FIG. 6 is a diagram illustrating contents of operations in the pulse radar device according to embodiment 3;

FIG. 14 is a diagram illustrating a schematic configuration of a conventional Golay correlator.

DETAILED DESCRIPTION

Hereinbelow, embodiments of the disclosure will be described with reference to the drawings.

(Underlying Knowledge Forming Basis of the Present Disclosure)

Figure 9:
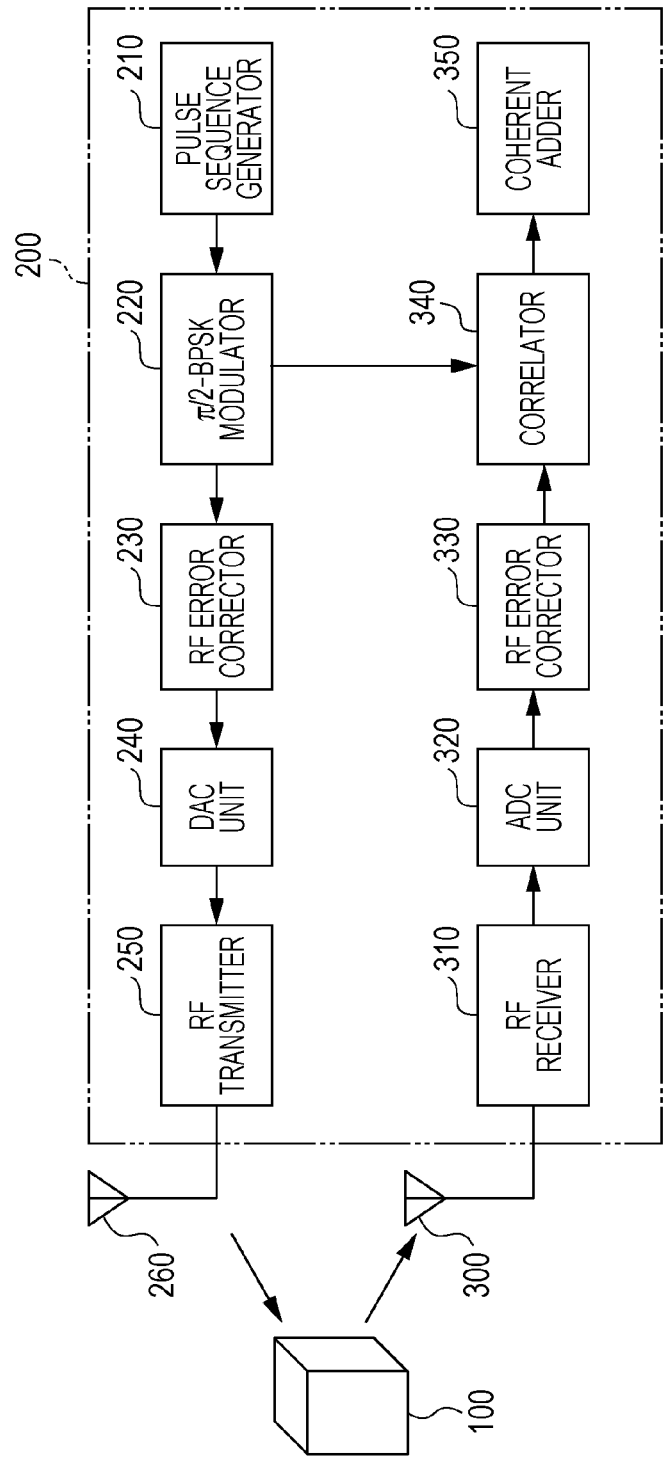
FIG. 9 is a diagram illustrating a schematic configuration of a pulse radar device in which π/2-BPSK modulation is employed and in which countermeasures against RF errors are carried out based on a method disclosed in Japanese Unexamined Patent Application Publication No. 2012-060569.

FIG. 9 is a block diagram illustrating a schematic configuration of a pulse radar device in which π/2-BPSK modulation is employed and in which countermeasures against RF errors based on the method disclosed in Japanese Unexamined Patent Application Publication No. 2012-060569 are used. The pulse radar device 200 illustrated in FIG. 9 includes a pulse sequence generator 210, a π/2-BPSK modulator 220, an RF error corrector 230, a DAC unit 240, a radio transmitter (RF transmitter) 250, a transmission antenna unit 260, a reception antenna unit 300, a radio receiver (RF receiver) 310, an ADC unit 320, an RF error corrector 330, a correlator 340, and a coherent adder 350.

The pulse sequence generator 210 generates sub-pulse sequences that are used in pulse compression technique, for instance, and generates pulse sequences that form Golay codes or Spano codes. The π/2-BPSK modulator 220 applies π/2 phase rotation to each of the sub-pulse sequences outputted from the pulse sequence generator 210 and maps information on the inputted pulse sequences in I-Q space.

The RF error corrector 230 cancels RF errors that are added in the RF transmitter 250. The DAC unit 240 performs digital-analog-converter (DAC) conversion of digital signals (I) and digital signals (Q) that are outputted from the π/2-BPSK modulator 220 and outputs baseband analog signal IQ signals.

The RF transmitter 250 upconverts the baseband analog IQ signals, outputted from the DAC unit 240, into high-frequency (radio-frequency) signals. The transmission antenna unit 260 transmits the signals, upconverted into the high-frequency signals by the RF transmitter 250, toward a target 100.

The reception antenna unit 300 receives the high-frequency signals reflected by the target 100. The RF receiver 310 converts the high-frequency signals (reflection signals), received by the reception antenna unit 300, into analog IQ signals in baseband. The ADC unit 320 performs analog-digital-converter (ADC) processing for the analog IQ signals so as to convert the analog IQ signals into digital IQ signals.

The RF error corrector 330 cancels RF errors added in the RF receiver 310. The correlator 340 applies π/2 phase reverse rotation to each sub-pulse in the digital IQ signals having been outputted from the ADC unit 320 and having undergone cancellation of the RF errors by the RF error corrector 330 and calculates correlation value with the transmitted pulse sequences. The coherent adder 350 makes addition of the correlation value, calculated by the correlator 340, times numbered in a specified number of additions.

Figure 10B:
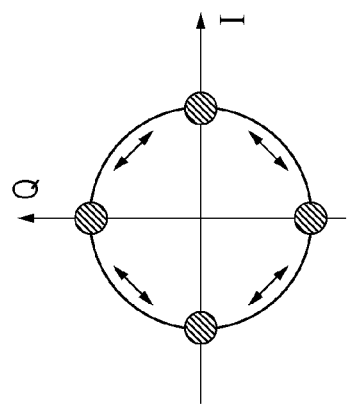
FIG. 10B is a diagram for description on the π/2-BPSK modulation.
Figure 10A:
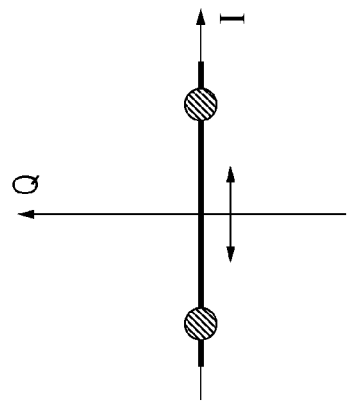
FIG. 10A is a diagram for description on BPSK modulation.

FIG. 10A is a diagram for description on BPSK modulation. FIG. 10B is a diagram for description on the π/2-BPSK modulation. In the BPSK modulation that is used in pulse radar devices, signals make transition on I-axis or Q-axis, as illustrated in FIG. 10A. In the π/2-BPSK modulation, in which π/2 in phase is added to each signal, odd-numbered sub-pulses are placed on the I-axis and even-numbered sub-pulses are placed on the Q-axis, as illustrated in FIG. 10B, for instance. Accordingly, a locus of the signal does not pass through vicinity of an origin (at which amplitudes of the I signal and the Q signal are zero). PAPR in the π/2-BPSK modulation is smaller than PAPR in the BPSK modulation.

Therefore, fluctuation range of the amplitude of the signals that are used in an RF unit (RF circuit) of a pulse radar device in which the π/2-BPSK modulation is employed is the smaller and allows use of a simple RF unit. Thus the RF unit that is small in circuit scale or the RF unit that is low in power consumption can be used.

Characteristics of the π/2-BPSK modulation in the RF unit under a condition that DC offset error or IQ imbalance error is mixed will be described. In the π/2-BPSK modulation, the π/2 phase rotation is applied to each sub-pulse at time of modulation in a transmission system and the π/2 phase reverse rotation is applied to each sub-pulse at time of demodulation (in the correlator) in a reception system. Data transmitted from the signals undergoes no change because such opposite phase rotation is operated at the time of the modulation and at the time of the demodulation.

As for the RF errors added in the RF unit in the transmission system or the RF unit in the reception system, the RF error of I channel and the RF error of Q channel are alternately added to the signals for every sub-pulse.

Figure 11A:
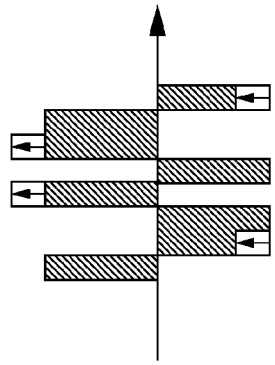
FIG. 11A is a diagram illustrating an example of a pulse sequence in which the RF errors are present.
Figure 11B:
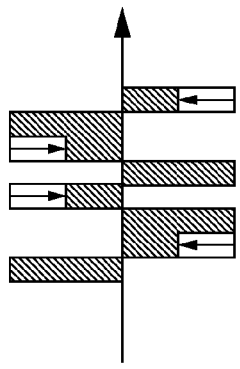
FIG. 11B is a diagram illustrating an example of a pulse sequence in which the RF errors are present.

FIG. 11A is a diagram illustrating an example in which an amplitude error among the IQ errors is added. Amplitude of even-numbered sub-pulses therein is half amplitude of odd-numbered sub-pulses. FIG. 11B is a diagram illustrating an example in which a DC offset error (herein, DC offset in Q channel) is added.

Odd-numbered sub-pulses therein are not changed but the DC offset in the Q channel is added to even-numbered sub-pulses. In the π/2-BPSK modulation, therefore, different RF errors are added to the odd-numbered sub-pulses and the even-numbered sub-pulses.

For signals containing the errors of FIG. 11A and FIG. 11B, accordingly, suppression characteristics for side lobes are deteriorated by performance of correlation calculation processing between transmission codes and reception signals for which the pulse compression technique is used. That is, a radar system having the RF errors causes deterioration in the suppression characteristics for the side lobes and deterioration in sensing characteristics.

The IQ errors include orthogonal amplitude error and orthogonal phase error. The orthogonal amplitude error is an error in ratio of magnitude of amplitude in the I-axis direction and amplitude in the Q-axis direction. The orthogonal phase error is an angle error by which a signal point deviates from the I-axis or the Q-axis in FIG. 10B, for instance.

FIG. 9 illustrates a method of reducing the RF errors in use of the π/2-BPSK modulation scheme in the conventional pulse radar device 200. In the transmission system, the RF error corrector 230 that counters the RF errors which are added in the RF transmitter 250 is provided in advance and the RF errors that are added in the RF transmitter 250 are thereby canceled. In the reception system, the RF errors that are added in the RF receiver 310 are cancelled in the RF error corrector 330 downstream in the reception system. The deterioration in the sensing characteristics can be reduced even if the π/2-BPSK modulation is performed because the RF errors can be cancelled out.

The conventional method, however, requires the RF error correctors 230 and 330 that correct the RF errors in the transmission system and the reception system. The RF error correctors 230, 330 require calculation of correction parameters. The correction parameters that are used in the RF error correctors 230, 330 need to be calculated by transmission of reference signals from the transmission system and by measurement of the RF errors produced by the RF transmitter 250 and the RF receiver 310.

The calculation of the correction parameters requires time dedicated to the calculation of the correction parameters as a training period. Production costs are also increased because it is necessary to prepare external measuring instruments (illustration is omitted) and to observe measurement values made by the external measuring instruments, for the RF errors in the transmission system, and because it is necessary to prepare an external signal generator, for the RF errors in the reception system, for instance.

Hereinbelow, a pulse radar device with use of the π/2-BPSK modulation scheme in which the training period or the external measuring instruments for calculating the correction parameters for the RF error correctors (correction circuits) are not required and in which the deterioration in the characteristics is reduced will be described.

In a pulse radar device, a plurality of identical pulses are initially transmitted for acquisition of coherent addition gain.

It is known that the sensing characteristics are deteriorated when π/2-BPSK modulation signals are transmitted as the identical pulses and when the RF errors (DC error or IQ errors, for instance) occur in an RF unit.

The disclosure, which takes notice of successive transmission of identical pulses that is performed in pulse radar devices, improves resistance to the RF errors with use of two methods. The first method is a method in which pulse sequences that satisfy specified constraint conditions are used for improvement in resistance to the IQ errors and the second method is a method in which phase of the pulse sequences that are transmitted is rotated for each pulse for improvement in resistance to the DC error.

Initially, the first method will be described.

Figure 2:
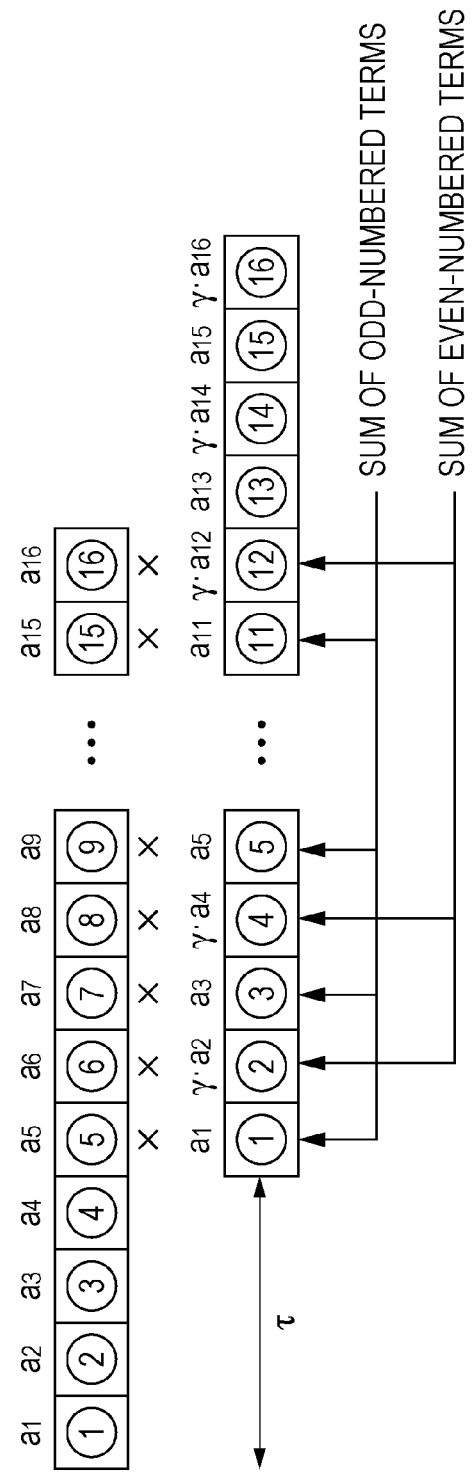
FIG. 2 is a diagram illustrating correlation calculation for a pulse sequence.

FIG. 2 is a diagram illustrating correlation calculation for a specified pulse sequence. The pulse sequence is composed of sixteen sub-pulses, for instance, and the sub-pulses $\{a_1, a_2, a_3, \ldots, a_{16}\}$ line up in the sequence. Subsequently, signals that result from the pulse sequence transmitted into a propagation path and that are received in a reception system will be described below. Though the signals are attenuated by being passed through the propagation path, the description will be given on assumption that the signals are received with an equal gain, in order to facilitate understanding. The sub-pulses undergo the π/2-BPSK modulation and thus different IQ errors are added to odd-numbered sub-pulses and even-numbered sub-pulses in the received sub-pulse sequence. The description herein will be given on assumption that an IQ error γ is added to the even-numbered sub-pulses, for simplification. The IQ error γ is a variable that represents a rate of change in amplitude or phase in comparison between the even-numbered sub-pulses and the odd-numbered sub-pulses and that is a complex number because phase rotation is included.

Therefore, the received sub-pulse sequence is composed of $\{a_1, \gamma a_2, a_3, \gamma a_4, a_5, \ldots, a_{15}, \gamma a_{16}\}$. Then the correlation calculation between the transmitted sub-pulse sequence $\{a_1, a_2, a_3, \ldots, a_{16}\}$ and the received sub-pulse sequence $\{a_1, \gamma a_2, a_3, \gamma a_4, a_5, \ldots, a_{15}, \gamma a_{16}\}$ is performed. The correlation value is calculated in status (delay τ) in which sampling timing is deviated by τ between the received sub-pulse sequence and the transmitted sub-pulse sequence.

In status of γ=1 without inclusion of the IQ error, the delay τ=0 makes the received sub-pulse sequence and the transmitted sub-pulse sequence have the same values. Then sixteen terms resultant from multiplication between the sub-pulse sequences are added as the correlation calculation and thus the correlation value under a condition of τ=0 is 16. The correlation value under a condition of τ≠0 is smaller than 16. It is known that use of complementary codes as the transmitted sub-pulse sequence makes sum of autocorrelation value of another sub-pulse sequence $\{b_1, b_2, b_3, \ldots, b_{16}\}$ and the correlation value under the same τ(≠0) zero and results in high spreading gain.

The correlation value in status where there is a deviation by the time τ for a pulse sequence in which the IQ error γ is included in the first sub-pulse sequence is obtained from an equation below.

The autocorrelation value of the sub-pulse sequence=$a_1 \cdot a_{\tau+1} + \gamma \cdot a_2 \cdot a_{\tau+2} + a_3 \cdot a_{\tau+3} + \ldots + a_{16-\tau} \cdot a_{16}$ Description will be given below on making those terms zero with use of four sub-pulse sequences under τ≠0.

When first sub-pulse sequence $\{a_1, a_2, a_3, \ldots, a_{16}\}$ of pulse A, second sub-pulse sequence $\{b_1, b_2, b_3, \ldots, b_{16}\}$ of pulse B, third sub-pulse sequence $\{c_1, c_2, c_3, \ldots, c_{16}\}$ of pulse C, and fourth sub-pulse sequence $\{d_1, d_2, d_3, \ldots, d_{16}\}$ of pulse D are defined, the constraint conditions that are obtained herein are expressed as follows.

$$a_1 \cdot a_{\tau+1} + \gamma a_2 \cdot a_{\tau+2} + a_3 \cdot a_{\tau+3} + \ldots + a_{16-\tau} \cdot a_{16} + b_1 \cdot b_{\tau+1} + \gamma b_2 \cdot b_{\tau+2} + b_3 \cdot b_{\tau+3} + \ldots + b_{16-\tau} \cdot b_{16} + c_1 \cdot c_{\tau+1} + \gamma c_2 \cdot c_{\tau+2} + c_3 \cdot c_{\tau+3} + \ldots + c_{16-\tau} \cdot c_{16} + d_1 \cdot d_{\tau+1} + \gamma d_2 \cdot d_{\tau+2} + d_3 \cdot d_{\tau+3} + \ldots + d_{16-\tau} \cdot d_{16} = 0$$

Four pulses "A, B, B', A''" of first half among eight pulses that are used in Spano codes are noticed as the pulse sequences in which the four pulses herein are used.

Herein, X' signifies reverse in order of X (into descending order). Under conditions of C=B' and D=A', relations below hold.

$$c_k = b_{17-k}$$

$$d_k = a_{17-k}$$

That is, a transmitted sub-pulse sequence for the pulse B' is $\{b_{16}, b_{15}, b_{14}, \ldots, b_1\}$ and thus the autocorrelation value of the pulse B' is expressed as follows.

$$b_{16} \cdot b_{16-\tau} + \gamma b_{15} \cdot b_{15-\tau} + b_{14} \cdot b_{14-\tau} + \ldots + b_{1+\tau} \cdot b_1$$

A permutation of terms in accordance with the pulse B is as follows.

$$\gamma b_1 \cdot b_{\tau+1} + b_2 \cdot b_{\tau+2} + \gamma b_3 \cdot b_{\tau+3} + \ldots + b_{16-\tau} \cdot b_{16}$$

where k has a value that is any one of 1 through 16.

When τ is an even number, substitution of the permutation for the constraint condition provides the following.

$$a_1 \cdot a_{\tau+1} + \gamma a_2 \cdot a_{\tau+2} + a_3 a_{\tau+3} + \ldots + \gamma a_{16-\tau} \cdot a_{16} + b_1 \cdot b_{\tau+1} + \gamma b_2 \cdot b_{\tau+2} + b_3 \cdot b_{\tau+3} + \ldots + \gamma b_{16-\tau} \cdot b_{16} + \gamma b_1 \cdot b_{\tau+1} + b_2 \cdot b_{\tau+2} + \gamma b_3 \cdot b_{\tau+3} + \ldots + b_{16-\tau} \cdot b_{16} + \gamma a_1 \cdot a_{\tau+1} + a_2 \cdot a_{\tau+2} + \gamma a_3 \cdot a_{\tau+3} + \ldots + a_{16-\tau} \cdot a_{16} = 0$$

Left side of the constraint condition is transformed into the following.

$$2(1+\gamma)(a_1 \cdot a_{\tau+1} + a_2 \cdot a_{\tau+2} + a_3 \cdot a_{\tau+3} + \ldots + a_{16-\tau} \cdot a_{16}) + 2(1+\gamma)(b_1 \cdot b_{\tau+1} + b_2 \cdot b_{\tau+2} + b_3 \cdot b_{\tau+3} + \ldots + b_{16-\tau} \cdot b_{16})$$

This condition is automatically satisfied providing A and B that are complementary codes are used.

When the delay T is an odd number, the constraint condition makes the following.

$$a_1 \cdot a_{\tau+1} + \gamma a_2 \cdot a_{\tau+2} + a_3 \cdot a_{\tau+3} + \ldots + a_{16-\tau} \cdot a_{16} + b_1 \cdot b_{\tau+1} + \gamma b_2 \cdot b_{\tau+2} + b_3 \cdot b_{\tau+3} + \ldots + b_{16-\tau} \cdot b_{16} + b_1 \cdot b_{\tau+1} + \gamma b_2 \cdot b_{\tau+2} + b_3 \cdot b_{\tau+3} + \ldots + b_{16-\tau} \cdot b_{16} + a_1 \cdot a_{\tau+1} + \gamma a_2 \cdot a_{\tau+2} + a_3 \cdot a_{\tau+3} + \ldots + a_{16-\tau} \cdot a_{16} = 0$$

Left side of the constraint condition is transformed into the following.

$$2(a_1 \cdot a_{\tau+1} + \gamma a_2 \cdot a_{\tau+2} + a_3 \cdot a_{\tau+3} + \ldots + a_{16-\tau} \cdot a_{16}) + 2(b_1 \cdot b_{\tau+1} + \gamma b_2 \cdot b_{\tau+2} + b_3 \cdot b_{\tau+3} + \ldots + b_{16-\tau} \cdot b_{16})$$

In order that the constraints may hold for γ having a desired value, the following constraints arranged with regard to γ are satisfied.

$$(a_1 \cdot a_{\tau+1} + a_3 \cdot a_{\tau+3} + \ldots + a_{16-\tau} \cdot a_{16}) + (b_1 \cdot b_{\Sigma+1} + b_3 \cdot b_{\tau+3} + \ldots + b_{16-\tau} \cdot b_{16}) = 0$$

and $$(a_2 \cdot a_{\tau+2} + a_4 \cdot a_{\tau+4} + \ldots + a_{15-\tau} \cdot a_{15}) + (b_2 \cdot b_{\tau+2} + b_4 \cdot b_{\tau+4} + \ldots + b_{15-\tau} \cdot b_{15}) = 0$$

Though the four pulses of the first half among the eight pulses of Spano codes have been described, description on four pulses "B, A, A', B'" of the second half is similar to that on the first half and is therefore omitted.

Under a condition that a set of complementary codes in reversed order (descending order) in four pulses such as "A, B, B', A'" or "B, A, A', B'" are used, as a constraint condition for reducing the deterioration in the side lobes due to the IQ error for every four pulses, and a condition that the delay in sampling timing is an odd number, as a constraint condition on logical value of each sub-pulse of the complementary codes, an arrangement results in the following.

$$\Sigma(a_i \cdot a_{i+\tau}) + \Sigma(b_i \cdot b_{i+\tau}) = 0$$

where i is even number and i+τ≤16 as a range of Σ.

$$\Sigma(a_i \cdot a_{i+\tau}) + \Sigma(b_i \cdot b_{i+\tau}) = 0$$

where i is odd number and i+τ≤16 as the range of Σ.

By use of the sub-pulse sequences that satisfy the constraint conditions, the IQ error can be cancelled for every four pulses.

Subsequently, the method for reducing the DC error will be described as the second method.

The IQ error can be cancelled by transmission and reception with use of the pulse sequences that satisfy the constraint conditions, as the first method, as described above. It is difficult, however, to cancel the DC error by the transmission and reception of the pulse sequences that satisfy the constraint conditions.

Therefore, the method in which the DC error is cancelled by adjustment in amount of the phase rotation for every four pulses will be described.

It is required to avoid deterioration in the cancellation of the IQ error that is attained by the first method, even if the phase is rotated for every four pulses. That is, the phase is fixed within the four pulses and the amount of the phase rotation is adjusted for every four pulses.

On condition that the amount of the phase rotation within the four pulses is π/2, a manner of addition of the RF errors in the π/2-BPSK modulation is varied.

On condition that the amount of the phase rotation is zero, initially, status is brought about in which the RF error in the I channel is added to the odd-numbered sub-pulses and in which the RF error in the Q channel is added to the even-numbered sub-pulses. That is, the RF error in the I channel and the RF error in the Q channel are alternately added at the signal points of FIG. 10B because phase difference between the signal points is π/2.

On condition that the amount of the phase rotation within the four pulses is π/2, by contrast, the odd-numbered sub-pulses on the I-axis shift onto the Q-axis by making π/2 rotation and the even-numbered sub-pulses on the Q-axis shift onto the I-axis by making π/2 rotation. That is, the RF error in the Q channel is added to the odd-numbered sub-pulses and the RF error in the I channel is added to the even-numbered sub-pulses.

Then existence of sub-pulse sequences in ascending order and sub-pulse sequences in descending order in the four pulses prevents the constraint condition (total of the autocorrelation values is zero) in the first method from holding and makes it difficult to cancel the IQ error.

On condition that the phase rotation is made by a unit of π, the RF error that is added to the sub-pulses undergoes no change. That is because the odd-numbered sub-pulses on the I-axis shift onto the I-axis again by making π rotation and because the even-numbered sub-pulses on the Q-axis shift onto the Q-axis again by making π rotation, on condition that the amount of the phase rotation within the four pulses is π.

Thus the disclosure reduces the deterioration in the sensing characteristics due to the DC error and the IQ error by the transmission and reception of the sub-pulse sequences in which the deterioration in the sensing characteristics due to the IQ error is reduced and by the reduction in the DC error by the rotation of the phase of the pulse sequences for every pulse transmission.

Therefore, the IQ error and the DC error that are RF errors can be reduced without the preliminary measurement for the RF correction parameters for reducing the RF errors in the RF transmitter and the RF receiver. Hereinbelow, description will be given with reference to specific examples of configuration.

(Embodiment 1)

Figure 1:
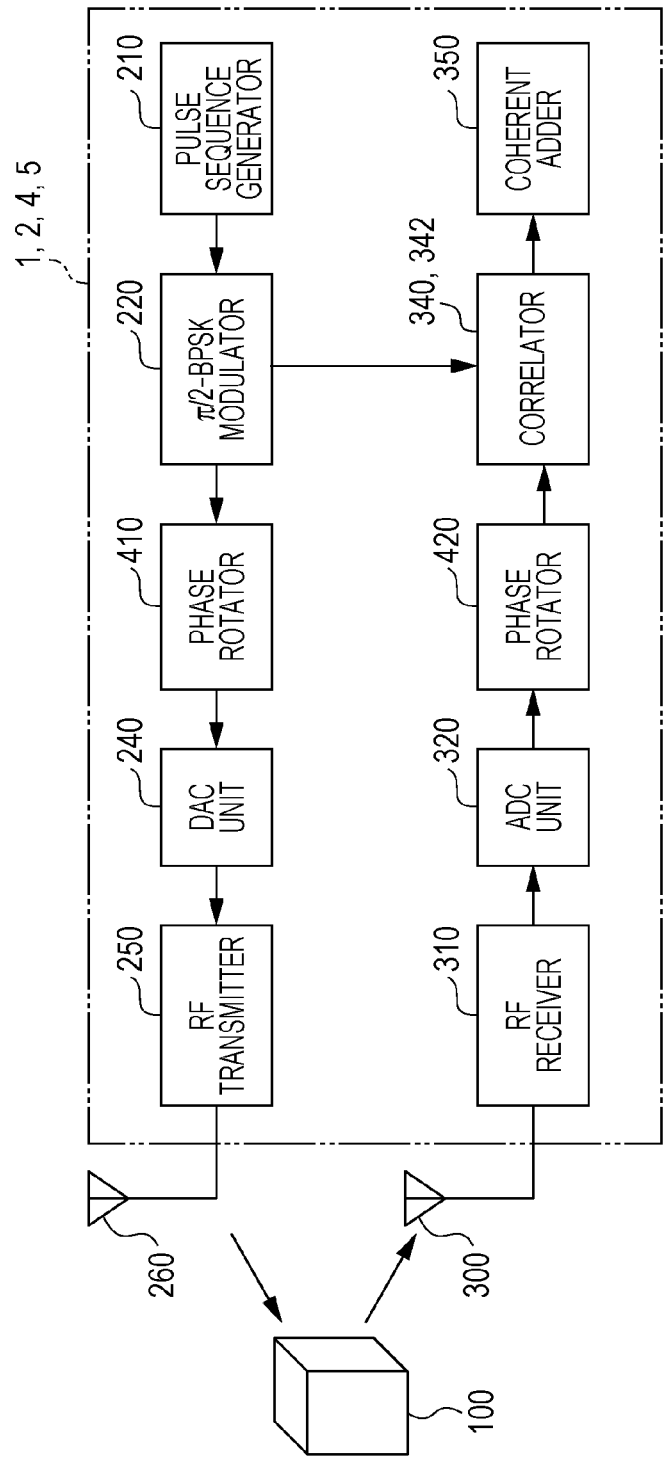
FIG. 1 is a diagram illustrating a schematic configuration of a pulse radar device according to embodiment 1.

FIG. 1 is a block diagram illustrating a schematic configuration of a pulse radar device according to embodiment 1. In FIG. 1, components common to the pulse radar device 200 of FIG. 9 that has been described above are designated by the same reference numerals. The pulse radar device 1 according to embodiment 1 includes the pulse sequence generator 210, the π/2-BPSK modulator 220, a phase rotator 410, the DAC unit 240, the RF transmitter 250, the transmission antenna unit 260, the reception antenna unit 300, the RF receiver 310, the ADC unit 320, a phase rotator 420, the correlator 340, and the coherent adder 350.

The pulse radar device 1 is different from the pulse radar device 200 of FIG. 9 that has been described, in sub-pulse sequences that are generated by the pulse sequence generator 210. Specific codes therein satisfy the constraint conditions described above. The pulse radar device 1 has the phase rotators 410 and 420 in place of the RF error correctors 230 and 330 of the pulse radar device 200 of FIG. 9.

In a transmission system of the pulse radar device 1 according to embodiment 1, the pulse sequence generator 210 generates pulse sequences that are used in the pulse compression technique, for instance. For instance, sub-pulse sequences including Spano codes are generated. The pulse sequence generator 210 may be a circuit that generates the sub-pulse sequences as occasion arises in accordance with regularity in characteristics of the Spano codes or a circuit that stores the sub-pulse sequences obtained in advance in a read only memory (ROM), for instance, and that outputs the sub-pulse sequences in accordance with specified timing. The Spano codes are generated with use of complementary codes.

The π/2-BPSK modulator 220 applies π/2 phase rotation to each of the sub-pulse sequences outputted from the pulse sequence generator 210 and maps information on the inputted sub-pulse sequences in the I-Q space. Two-dimensional information on the I signal and the Q signal is included in output of the π/2-BPSK modulator 220.

The phase rotator 410 applies phase rotation operation for every pulse to the I signal and the Q signal that are outputted from the π/2-BPSK modulator 220 and outputs the I signal and the Q signal that have undergone the phase rotation. The DAC unit 240 converts the I signal and the Q signal that are digital signals into the I signal and the Q signal that are analog signals. The DAC unit 240 includes two DACs, namely, a DAC for the I signal and a DAC for the Q signal.

The RF transmitter (radio transmitter) 250 upconverts the IQ signals that are digital signals in baseband, outputted from the DAC unit 240, into high-frequency signals (RF signals). The transmission antenna unit 260 transmits the high-frequency signals that result from upconversion by the RF transmitter 250. The high-frequency signals outputted from the transmission antenna unit 260 impinge on the target 100 and are thereby reflected.

In a reception system of the pulse radar device 1 according to embodiment 1, the reception antenna unit 300 receives the high-frequency signals reflected by the target 100. The RF receiver (radio receiver) 310 converts the high-frequency signals, received by the reception antenna unit 300, into the I signal and the Q signal that are analog signals in baseband.

The ADC unit 320 includes two DACs, namely, a DAC for the I signal and a DAC for the Q signal and converts the I signal and the Q signal that are analog signals into the I signal and the Q signal that are digital signals. The phase rotator 420 adds a phase, opposite to a phase provided by the phase rotator 410 of the transmission system, to the I signal and the Q signal that are outputted from the ADC unit 320 and outputs the resultant signals.

The correlator 340 applies π/2 phase reverse rotation (−π/2 phase rotation) for every sub-pulse to the I signal and the Q signal that are outputted from the phase rotator 420 and outputs a correlation value between the signals and the transmitted pulse sequence. The correlator 340 is made of a common sliding correlator and transmitted codes are used as correlation codes.

The coherent adder 350 makes coherent addition of the correlation value output calculated by the correlator 340, times numbered in a specified number of additions. By the coherent addition, a coherent addition gain is obtained with respect to the signals buried in thermal noise so that signals of reflected waves from afar having poor signal noise ratio (SNR) can be detected.

In the pulse radar device 1 according to embodiment 1, which cancels the IQ error within four pulses, the DC error produced in the π/2-BPSK modulation is cancelled by combination of four pulses on first half and four pulses on second half with use of a method in which amount of the phase rotation is fixed within every four pulses and in which π phase rotation is applied for every four pulses.

The phase rotation is made at two sites, namely, the phase rotator 410 in the transmission system and the phase rotator 420 in the reception system. Different phase rotation is applied for every four pulses, whereas the phase rotation opposite to the phase rotation applied in the transmission system is applied in the reception system.

The phase rotation in the transmission system that is applied to the signals to be transmitted is cancelled out by the reverse rotation in phase in the reception system and thus values of the information are not changed between transmission side and reception side.

The DC error added by the transmission and reception is superposed on the signals to which the phase rotation has been applied.

Based on the above, pulse sequences that satisfy the above constraint conditions are initially used for Spano codes "A, B, B', A', B, A, A', B'". In addition, phase rotation 0 (rad) is applied to the four pulses on the first half and phase rotation π (rad) is applied to the four pulses on the second half. The IQ error is reduced by the sub-pulse sequences of Spano codes that satisfy the constraint conditions and the deterioration in the side lobes due to the DC error is reduced by the further application of the phase rotation for every four pulses and by the combination of the four pulses in the first half and the four pulses in the second half.

Figure 3:
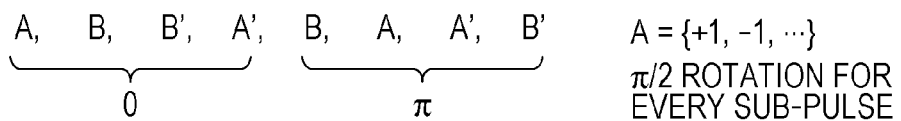
FIG. 3 is a diagram illustrating phase rotation in the pulse radar device according to embodiment 1.

FIG. 3 is a diagram illustrating the phase rotation in the pulse radar device 1 according to embodiment 1. For such a pulse sequence as "A, B, B', A', B, A, A', B'" illustrated in FIG. 3 in which four pulses "B, A, A', B'" in order (descending order) reverse to four pulses "A, B, B', A'" in the first half form the second half part of the pulse sequence, the IQ error is cancelled within the four pulses by use of the pulse sequence that satisfies the above constraints on the sub-pulse sequences. In addition, the π phase rotation is provided for every four pulses.

With use of this configuration, a system can be provided that reduces the deterioration in the sensing characteristics by the cancellation of the DC error by the combination of the four pulses in the first half and the four pulses in the second half without the preliminary calculation of the correction parameters for the RF errors. The amount of the phase rotation in the transmission system is the amount of the phase rotation in the phase rotator 410 and the amount of the phase rotation in the reception system is the amount of the phase rotation in the phase rotator 420. π is 180° and −π is −180°.

Thus the pulse radar device 1 according to embodiment 1 includes the pulse sequence generator 210 that generates the pulse sequence including Spano codes, the π/2-BPSK modulator 220 that applies the π/2-BPSK modulation to the pulse sequence generated by the pulse sequence generator 210, and the phase rotator 410 that rotates the phase of each pulse in the output of the π/2-BPSK modulator 220, in the transmission system, and includes the phase rotator 420 that provides the phase opposite to the phase provided by the phase rotator 410 of the transmission system and the correlator 340 that performs the correlation calculation for the output of the phase rotator 420 based on the output of the π/2-BPSK modulator 220, in the reception system, and the pulse radar device that is capable of reducing the RF errors without the preliminary calculation of the correction parameters for the RF errors can consequently be provided.

The use of the π/2-BPSK scheme as a modulation scheme mitigates the PAPR in the RF unit that is used, thereby facilitates design of the RF unit, and consequently enables provision of the RF unit that is smaller in circuit scale or lower in power consumption in comparison with the conventional BPSK scheme.

Though the π/2-BPSK has been described for the pulse radar device 1 according to embodiment 1, π/2-shifted BPSK can similarly be used.

(Embodiment 2)

Subsequently, embodiment 2 will be described. For a pulse radar device according to embodiment 2, which is similar in configuration to the pulse radar device 1 according to embodiment 1 described above, FIG. 1 is invoked and reference numeral 2 is provided.

In the pulse radar device 2 according to embodiment 2, which is different from the pulse radar device 1 according to embodiment 1 in sub-pulse sequences that are used, sub-pulse sequences that satisfy constraint conditions severer than the constraint conditions used in the pulse radar device 1 according to embodiment 1 are used.

There is also a difference in manner of applying phase rotation in a unit of pulse that is applied in accordance with the constraint conditions. In an environment with Doppler phase variation, the pulse radar device 1 according to embodiment 1, in which the IQ error is cancelled within four pulses, has great residual IQ error due to the Doppler phase variation. In the pulse radar device 2 according to embodiment 2, therefore, a method in which the IQ error is cancelled within two pulses is adopted. The method will be described below.

It is conceived that the correlation values are made into zero with use of two pulses with the delay τ≠0.

When A code $\{a_1, a_2, a_3, \ldots, a_{16}\}$ of first pulse and B code $\{b_1, b_2, b_3, \ldots, b_{16}\}$ of second pulse are defined, the correlation value in status in which sampling timing is deviated by τ is as follows.

$$a_1 \cdot a_{\tau+1} + \gamma a_2 \cdot a_{\tau+2} + a_3 \cdot a_{\tau+3} + \ldots + a_{16-\tau} \cdot a_{16} + b_1 \cdot b_{\tau+1} + \gamma b_2 \cdot b_{\tau+2} + b_3 \cdot b_{\tau+3} + \ldots + b_{16-\tau} \cdot b_{16} = 0$$

In the constraint conditions for satisfying constraints on any desired delay γ, terms multiplied by the delay γ and terms not multiplied by the delay γ are zero. That is, the following need to be satisfied under the condition of τ≠0.

$$\Sigma(a_i \cdot a_{i+\tau}) + \Sigma(b_i \cdot b_{i+\tau}) = 0$$

where i is even number and i+τ≤16 as a range of Σ.

$$\Sigma(a_i \cdot a_{i+\tau}) + \Sigma(b_i \cdot b_{i+\tau}) = 0$$

where i is odd number and i+τ≤16 as the range of Σ.

Even if the IQ error is mixed in, the sub-pulse sequences that satisfy the above constraint conditions can cancel the IQ error within two pulses.

Subsequently, the DC error will be described.

The IQ error is cancelled within two pulses and thus the phase rotation for the DC error is made for every two pulses. In the pulse radar device 2 according to embodiment 2, the π phase rotation may be made for every four pulses as in the pulse radar device 1 according to embodiment 1 described above, whereas the RF errors can be cancelled with higher accuracy by π/2 phase rotation for every two pulses.

That is because the π/2 phase rotation results in the same amount of the rotation since the sub-pulse sequence in two pulses is either in the ascending order or in the descending order. On condition that the π/2 phase rotation is made for every two pulses, the DC error is cancelled by the pulses A, B and the pulses B, A and by the pulses B', A' and the pulses A', B'.

FIG. 4 is a diagram illustrating the phase rotation in the pulse radar device 2 according to embodiment 2. In FIG. 4, amounts of the phase rotation in the transmission system are used in the phase rotator 410 and amounts of the phase rotation in the reception system are used in the phase rotator 420. By the phase rotation for every two pulses, the DC error can be cancelled and residual components in the IQ error cancellation by the constraints on the codes can further be cancelled.

Doppler resistance is increased because the IQ error can thus be cancelled within two pulses and sensing performance can consequently be improved in comparison with embodiment 1.

In the pulse radar device 2 according to embodiment 2, in this manner, the IQ error is cancelled out within two pulses and the Doppler resistance is thereby increased in comparison with the pulse radar device 1 according to embodiment 1. As a result, the pulse radar device with use of the π/2-BPSK modulation scheme in which the RF errors are reduced without the preliminary measurement for the RF correction parameters can be provided.

Though the π/2-BPSK has been described for the pulse radar device 2 according to embodiment 2, the π/2-shifted BPSK can similarly be used.

(Embodiment 3)

The pulse radar device 1 according to embodiment 1 or the pulse radar device 2 according to embodiment 2 which devices have been described above presuppose use of the π/2-BPSK modulation scheme. In the modulation scheme, I- or Q-constellation is provided with code information on pulse compression. A pulse radar device according to embodiment 3 has an aim of minimizing PAPR in an RF unit that is used therein. In the device that is a pulse radar device, a transmitter that transmits pulses and a receiver that receives the pulses are integrated in the same device.

In the pulse radar device according to embodiment 3, information is provided into phase rotation that is provided for each sub-pulse unit. Constant π/2 rotation in phase of signals that are transmitted by a transmission system is made in consideration of peak to average power ratio (PAPR), as illustrated by (I, Q)=(1, 0)→(0, 1)→(−1, 0)→(0, −1)→ in FIG. 10B.

Figure 5:
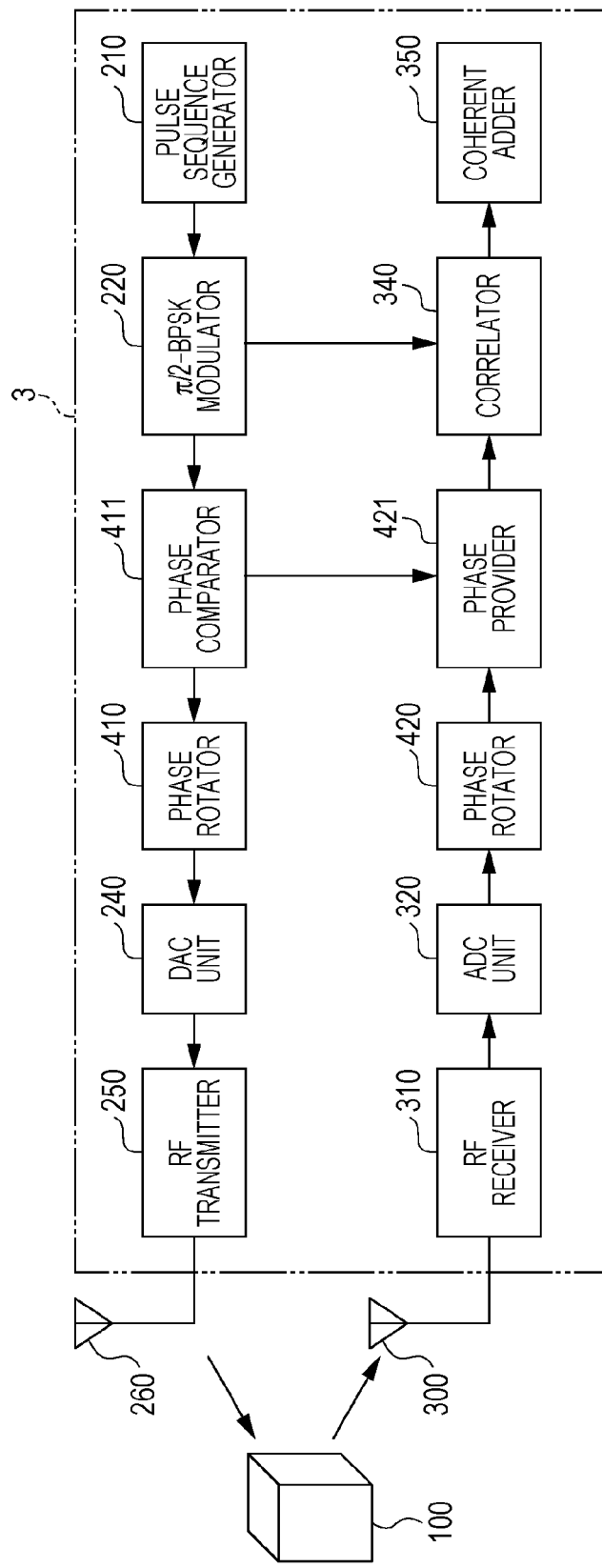
FIG. 5 is a diagram illustrating a schematic configuration of a pulse radar device according to embodiment 3.

FIG. 5 is a block diagram illustrating a schematic configuration of the pulse radar device according to embodiment 3. In FIG. 5, components common to the pulse radar device 1 according to embodiment 1 described above are designated by the same reference numerals. As illustrated in FIG. 5, the pulse radar device 3 according to embodiment 3 has a configuration in which a phase comparator 411 and a phase provider 421 are added to the pulse radar device 1 according to embodiment 1.

Though the phase rotator 410 is placed downstream of the phase comparator 411 and the phase rotator 420 is placed upstream of the phase provider 421 in FIG. 5, the phase rotator 410 may be placed upstream of the phase comparator 411 and the phase rotator 420 may be placed downstream of the phase provider 421.

FIG. 6 is a diagram illustrating contents of operations in the pulse radar device 3 according to embodiment 3. The pulse sequence generator 210 generates signal sequences that are used in pulse compression. The signal sequences each correspond to transmission information (either of 1, −1) in FIG. 6. The transmission information is inputted into the π/2-BPSK modulator 220 and mapping values (any of (1, 0), (0, 1), (−1, 0), (0, −1)) are outputted therefrom. A transmission signal that is output from the phase comparator 411 is fixed at a signal having undergone the π/2 phase rotation as illustrated in FIG. 10B and thus phase difference between the transmission signal and the mapping values is calculated. In the pulse radar device 3 according to the embodiment, information is added to the phase difference. The phase difference information is transmitted from the transmission system to the reception system.

The reception system receives the signal that has undergone the π/2 phase rotation. Phase rotation (either 0 or π) from the phase comparator 411 in the transmission system is provided by the phase provider 421 for the reception signal (output of the ADC unit 320 and any of (1, 0), (0, 1), (−1, 0), (0, −1)). Signal points provided with the phase are entered in "DEMAPPING" section. Code information (either of 1, −1) is obtained by demodulation of a signal point in "DEMAPPING". After that, sensing processing is carried out through correlation calculation of the code information.

Such a configuration of the pulse radar device 3 according to embodiment 3 minimizes the PAPR because the signal outputted toward the target 100 makes a precise circle and thus facilitates design of the RF unit.

(Embodiment 4)

Description will be given on a method of providing a correlator of the π/2-BPSK scheme by addition of simple circuits to a correlator of a common BPSK scheme in provision of a pulse radar of the π/2-BPSK scheme in the pulse radar device 1 according to embodiment 1 or the pulse radar device 2 according to embodiment 2 which devices have been described above.

Figure 12:
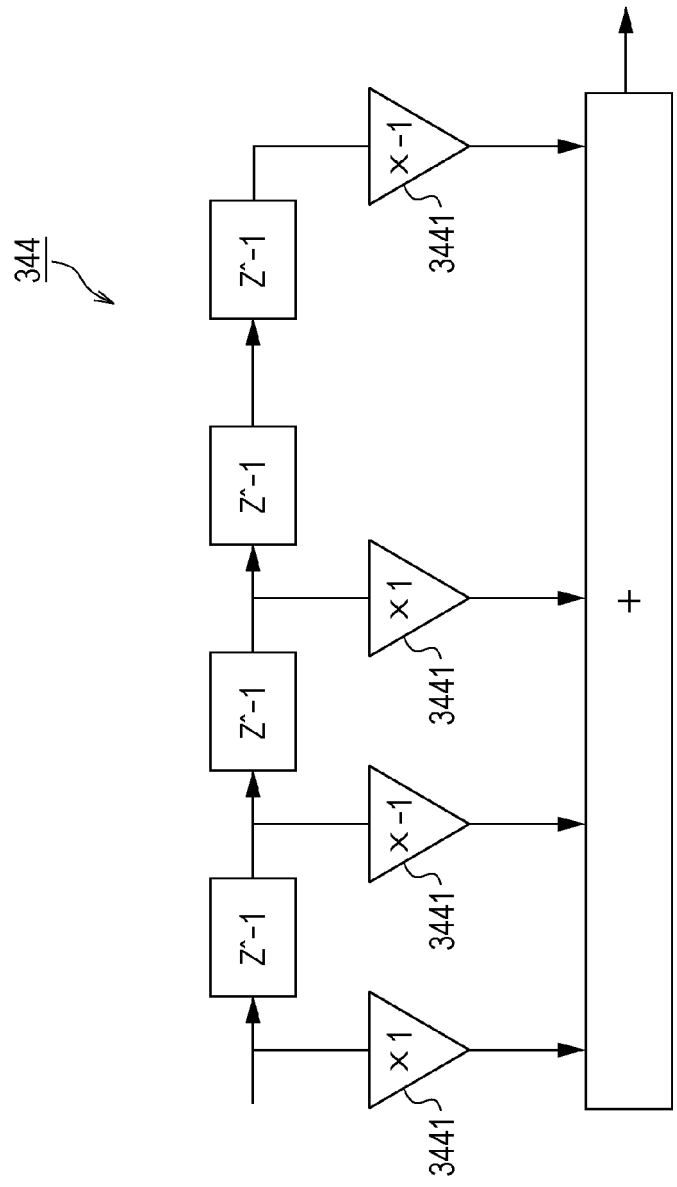
FIG. 12 is a diagram illustrating a schematic configuration of a correlation circuit that supports conventional BPSK modulation.
Figure 13:
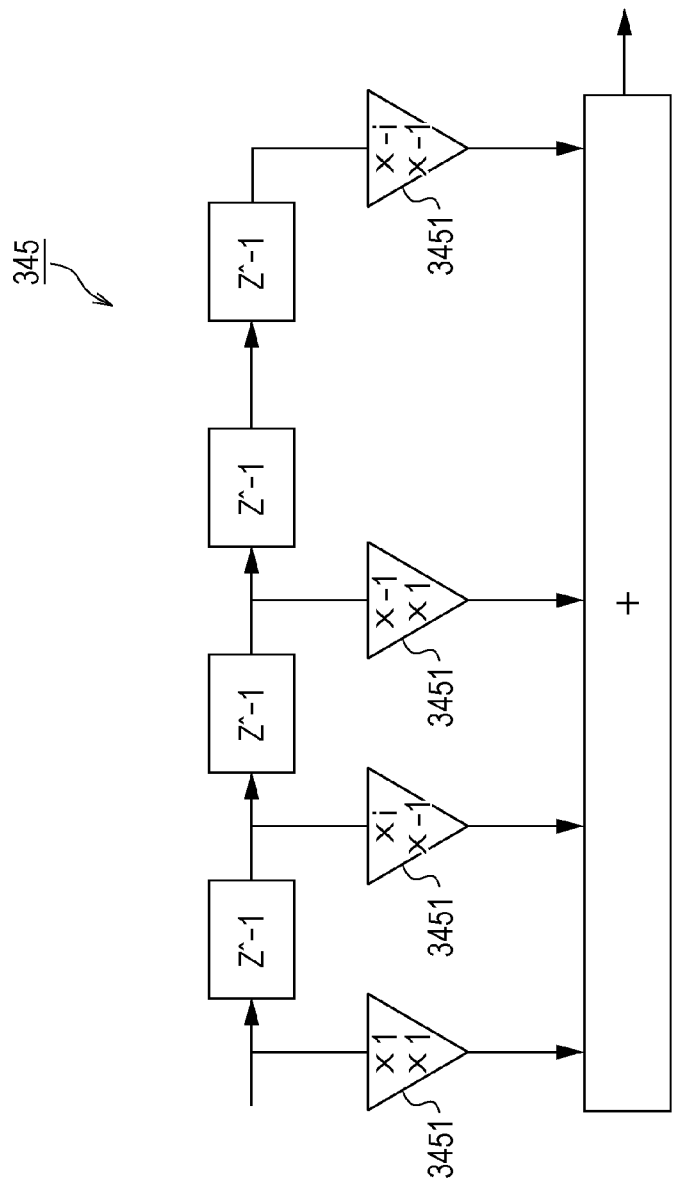
FIG. 13 is a diagram illustrating a schematic configuration of a correlator that supports conventional π/2-BPSK modulation.

FIG. 12 is a diagram illustrating a schematic configuration of the correlation circuit that supports the BPSK modulation. FIG. 13 is a diagram illustrating a schematic configuration of the correlator that supports the π/2-BPSK modulation. The correlation circuit 344 of FIG. 12 and the correlator 345 of FIG. 13 employ a similar configuration but differ in multiplier coefficient. In the correlator 345 of FIG. 13, phase with addition of π/2 is provided for every coefficient. TAP multipliers 3441 in the correlation circuit 344 of FIG. 12 are either x1 or x−1, whereas the correlator 345 of FIG. 13 has four types of TAP multipliers 3451, that is, x1, xi, x−1, and x−i. Since i is a complex number, it is necessary to carry out operations with complex logic for every TAP coefficient in the correlator 345.

In a pulse radar device according to embodiment 4, the correlator that is equivalent to the correlator 345 of FIG. 13 and that supports the π/2-BPSK modulation is provided by addition of configurations as few as possible to the correlation circuit 344 of FIG. 12 that supports the BPSK modulation.

For the pulse radar device according to embodiment 4, which is similar in configuration to the pulse radar device 1 according to embodiment 1 described above, FIG. 1 is invoked and reference numeral 4 is provided.

Figure 7:
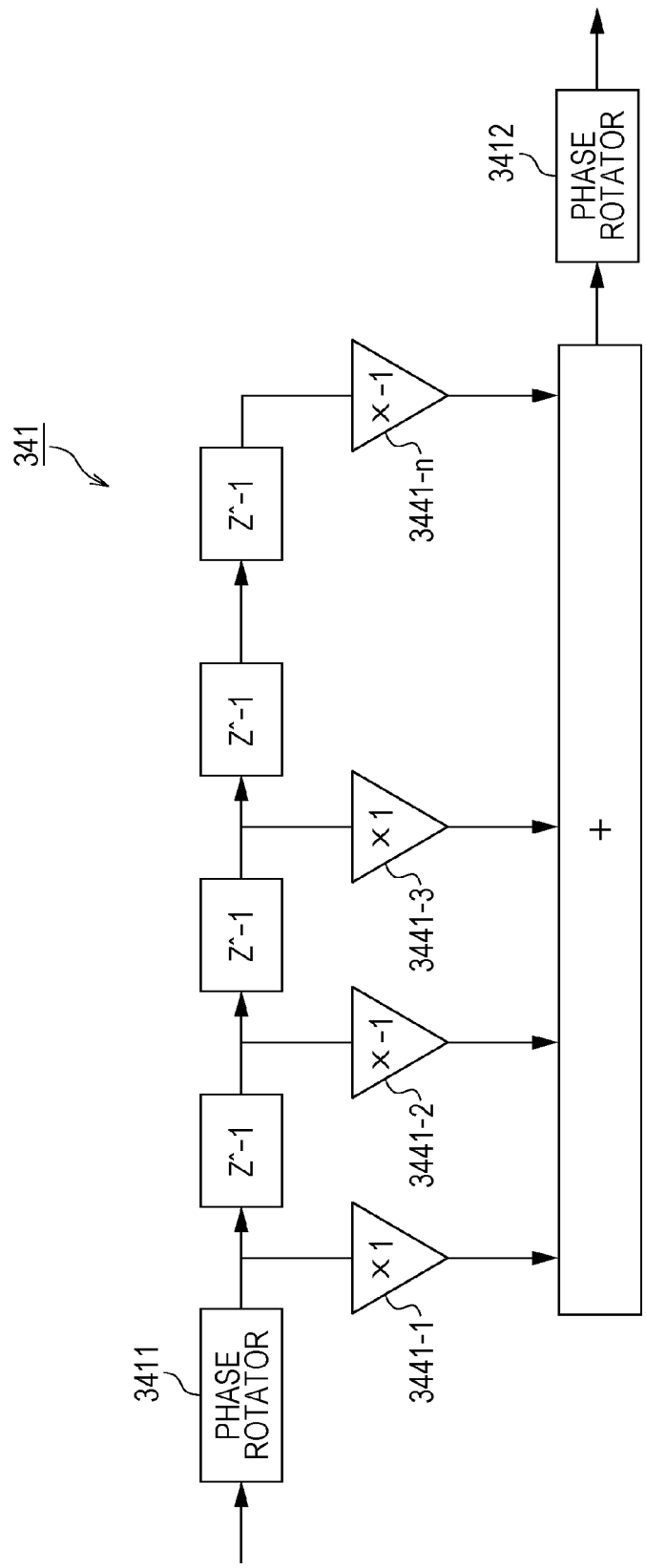
FIG. 7 is a diagram illustrating a schematic configuration of a correlator of π/2-BPSK modulation scheme that is used in a pulse radar device according to embodiment 4.

FIG. 7 is a diagram illustrating a schematic configuration of a correlator 341 that is based on the correlation circuit 344 of FIG. 12 which supports the BPSK modulation and that supports the π/2-BPSK modulation. To the correlation circuit 344 of FIG. 12, a phase rotator 3411 in first stage for stream input and a phase rotator 3412 in final output stage for the correlator are added. Multiplication constant for each TAP coefficient for the correlator is either x1 or x−1 because the same coefficients as in the BPSK modulation in the correlation circuit 344 of FIG. 12 are used.

The phase rotator 3411 in the first stage separately applies π/2×N phase rotation for every sampling period to an input signal in N-th stream. The phase rotator 3412 in the downstream stage separately applies −π/2×N phase rotation for every sampling period to N-th signal in final output.

For multiplier coefficient for the TAPs 3441, because of the addition of the phase rotator 3411 in the first stage in FIG. 7, TAP 3441-1 in first stage is equivalent to the coefficient multiplied by x1, TAP 3441-2 in second stage is equivalent to the coefficient multiplied by xi, TAP 3441-3 in third stage is equivalent to the coefficient multiplied by x(−1), TAP 3441-4 in fourth stage is equivalent to the coefficient multiplied by x(−i), and TAP 3441-5 in fifth stage is equivalent to the coefficient multiplied by x1.

Input signals for the phase rotator 3412 are signals that are multiplied by x1, xi, x(−1), x(−i), x1, . . . for every time step. Therefore, the input signals are inversely rotated by the phase rotator 3412 and thus signals equivalent to signals in the π/2-BPSK modulation can be calculated though status of initial phase is indefinite.

The correlation circuit 344 that supports the BPSK modulation can be modified into the correlator 341 that supports the π/2-BPSK modulation by use of a circuit configuration of FIG. 7.

(Embodiment 5)

For a pulse radar device according to embodiment 5, which is similar in configuration to the pulse radar device 1 according to embodiment 1 described above, FIG. 1 is invoked and reference numeral 5 is provided.

In a common pulse radar device in which Golay codes are used, a Golay correlator of FIG. 14 is used as a correlator. In the Golay correlator 346, multiplication by x1 or x−1 is carried out by a multiplier 3462 downstream of each delay device 3461. The Golay codes are complementary codes generated in accordance with specified generation rules.

Figure 8:
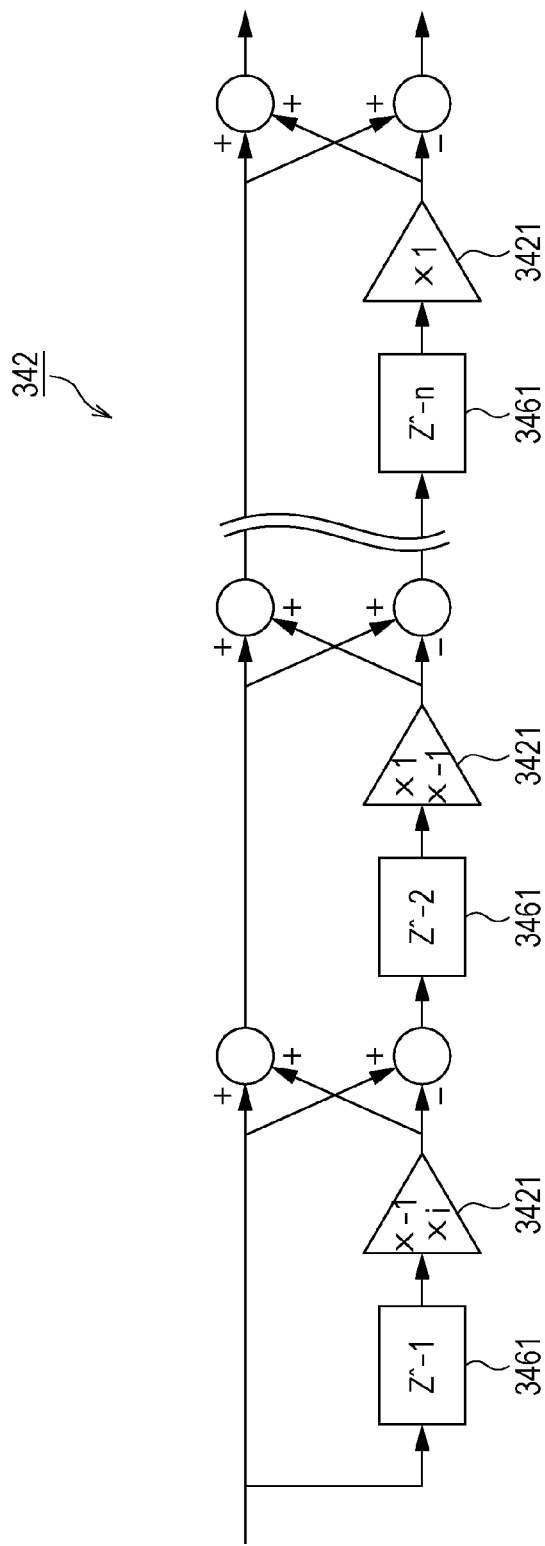
FIG. 8 is a diagram illustrating a schematic configuration of a Golay correlator that is used in a pulse radar device according to embodiment 5.

FIG. 8 is a diagram illustrating a schematic configuration of a Golay correlator 342 that supports the π/2-BPSK. Differences from the correlator 346 of FIG. 14 are coefficient by which the multiplier 3462 downstream of the first-stage delay device 3461 is multiplied and coefficient by which the multiplier 3462 downstream of the second-stage delay device 3461 is multiplied.

In a multiplier 3421 downstream of the first-stage delay device 3461 in the Golay correlator 342 for the pulse radar device 5 according to embodiment 5, xi is added to existing multiplier factor. In a multiplier 3421 downstream of the second-stage delay device 3461, x−1 is added to existing multiplier factor. Multiplier factors for other multipliers 3421 are the same as existing multiplier factors.

Modification in the multiplier factors for the two multipliers 3421 in the conventional Golay correlator enables correlation calculation with use of the Golay correlator that supports the π/2-BPSK and thus the correlator that supports the π/2-BPSK modulation can be provided with use of a simple configuration in which increase in circuit scale is reduced.

Though embodiments 1 through 5 have been described above with reference to the drawings, it is needless to say that the disclosure is not limited to such examples. It is apparent that those skilled in the art can conceive various alterations or modifications within the scope described in the embodiments and it is to be understood that such alterations and modifications shall fall under the technical scope of the disclosure as a matter of course.

Though the disclosure has been described with reference to the examples in which configuration is provided with use of hardware for the embodiments, the disclosure may be implemented by software in cooperation with hardware.

Functional blocks that are used for description on the embodiments are typically implemented as LSIs that are integrated circuits. The LSIs may separately be made into single chips or some or all of the LSIs may be integrated into a single chip. Elements referred to as LSIs herein may be referred to as ICs, system LSIs, super LSIs, or ultra LSIs in accordance with degree of integration.

Technology of forming the integrated circuits may be achieved by use of dedicated circuits or general-purpose processors without limitation to LSIs. For instance, field programmable gate arrays (FPGAs) that are programmable after manufacture of the LSIs and/or reconfigurable processors in which connection or setting of circuit cells inside the LSI can be reconfigured may be used.

Furthermore, in case where a new technology for forming integrated circuits that replace LSIs is developed as a result of progress in semiconductor technology or other technologies derived therefrom, integration for the functional blocks may be attained with use of such technology, as a matter of course. Such possibility may include application of biotechnology and the like.

(Summary of One Aspect of the Disclosure)

A First Pulse Radar Device of the Disclosure is a Pulse Radar Device including a pulse sequence generator that generates a pulse sequence with use of two sub-pulse sequences which are complementary codes, a π/2-BPSK modulator that generates modulation signals resultant from π/2-BPSK modulation of the sub-pulses of the sub-pulse sequences, a first phase rotator that provides phase rotation by a first phase for the modulation signals for every specified number of pulses, and a radio transmitter that transmits the modulation signals having undergone the phase rotation, in a transmission system, wherein the two sub-pulse sequences include a first sub-pulse sequence and a second sub-pulse sequence, and sum of total of odd-numbered terms of correlation calculation value between the first sub-pulse sequence and the first sub-pulse sequence having a specified timing deviation and total of odd-numbered terms of correlation calculation value between the second sub-pulse sequence and the second sub-pulse sequence having the specified timing deviation is zero and sum of total of even-numbered terms of the correlation calculation value between the first sub-pulse sequence and the first sub-pulse sequence having the specified timing deviation and total of even-numbered terms of correlation calculation value between the second sub-pulse sequence and the second sub-pulse sequence having the specified timing deviation is zero.

A second pulse radar device of the disclosure is the first pulse radar device including a radio receiver that receives reflected signals, a second phase rotator that provides a phase opposite to the phase provided by the first phase rotator, and a correlator that performs correlation calculation for output of the second phase rotator, based on output of the π/2-BPSK modulator, in a reception system.

A third pulse radar device of the disclosure is the first pulse radar device further including a phase comparator that provides a specified phase for the modulation signals so that positions of signal points of the modulation signals on IQ plane are rotated in a specified direction for each of the sub-pulses, in the transmission system.

A fourth pulse radar device of the disclosure is the third pulse radar device including a radio receiver that receives reflected signals and a phase provider that provides the phase, provided by the phase comparator for each of the sub-pulses, for the received reflected signals, in the reception system.

A fifth pulse radar device of the disclosure is the second pulse radar device in which the correlator that is of BPSK modulation scheme and that is provided with a phase rotator in input stage and a phase reverse rotator in output stage is used.

A sixth pulse radar device of the disclosure is the second pulse radar device in which the pulse sequence is Golay code and in which the correlator with values corresponding to π/2 and π phase rotation respectively added to a multiplication constant in first stage and a multiplication constant in second stage in a Golay correlator is used.

A seventh pulse radar device of the disclosure is the first pulse radar device in which the pulse sequence generator further generates a third sub-pulse sequence reverse in order to the first sub-pulse sequence and a fourth sub-pulse sequence reverse in order to the second sub-pulse sequence and repetitively outputs four pulses generated from the first sub-pulse sequence, the second sub-pulse sequence, the third sub-pulse sequence, and the fourth sub-pulse sequence, while changing order of the pulses, and in which the first phase rotator provides the phase rotation for every set of the four pulses.

An eighth pulse radar device of the disclosure is the first pulse radar device in which the pulse sequence generator further generates a third sub-pulse sequence reverse in order to the first sub-pulse sequence and a fourth sub-pulse sequence reverse in order to the second sub-pulse sequence and repetitively outputs four pulses generated from the first sub-pulse sequence, the second sub-pulse sequence, the third sub-pulse sequence, and the fourth sub-pulse sequence, while changing order of the pulses, and in which the first phase rotator provides same amount of the phase rotation for first two pulses in the first sub-pulse sequence and the second sub-pulse sequence and for second two pulses in the third sub-pulse sequence and the fourth sub-pulse sequence.

The disclosure is effective for overall devices including a communication device and a radar device in which the π/2-BPSK modulation scheme is used.

What is claimed is:

1. A pulse radar device comprising:
    a pulse sequence generator that, in operation, generates a pulse sequence using two sub-pulse sequences including a first sub-pulse sequence and a second sub-pulse sequence, wherein the two sub-pulse sequences are complementary codes and satisfy constraint conditions including:
    (i) a sum of a total of odd-numbered terms of correlation calculation value between the first sub-pulse sequence and the first sub-pulse sequence having a specified timing deviation and a total of odd-numbered terms of correlation calculation value between the second sub-pulse sequence and the second sub-pulse sequence having the specified timing deviation is zero, and
    (ii) a sum of a total of even-numbered terms of the correlation calculation value between the first sub-pulse sequence and the first sub-pulse sequence having the specified timing deviation and a total of even-numbered terms of correlation calculation value between the second sub-pulse sequence and the second sub-pulse sequence having the specified timing deviation is zero;
    a Π/2-BPSK modulator that, in operation, generates modulation signals resultant from Π/2-BPSK modulation of the first sub-pulse sequence and the second sub-pulse sequence;
    a first phase rotator that, in operation, applies phase rotation by a first phase to the modulation signals for every specified number of pulses; and
    a radio transmitter that, in operation, transmits the modulation signals having undergone the phase rotation.

2. The pulse radar device according to claim 1, further comprising:
    a radio receiver that, in operation, receives reflected signals that are the transmitted modulation signals reflected by a target;
    a second phase rotator that, in operation, applies phase rotation by a second phase that is opposite to the first phase for the reflected signals; and
    a correlator that, in operation, performs correlation calculation on an output of the second phase rotator, based on the modulation signals that are outputs of the Π/2-BPSK modulator.

3. The pulse radar device according to claim 1, further comprising:
    a phase comparator that, in operation, provides a specified phase for the modulation signals that are outputs of the Π/2-BPSK modulator and rotates positions of signal points of the modulation signals on IQ plane in a specified direction for each of the sub-pulses.

4. The pulse radar device according to claim 3, comprising:
    a radio receiver that, in operation, receives reflected signals; and
    a phase provider that, in operation, provides the specified phase, provided by the phase comparator for each of the sub-pulses, for the received reflected signals that are the transmitted modulation signals reflected by a target.

5. The pulse radar device according to claim 2, wherein the correlator includes
    a correlation circuit corresponding to BPSK modulation scheme,
    a phase rotator disposed in an input stage of the correlation circuit, and
    a phase reverse rotator disposed in an output stage of the correlation circuit.

6. The pulse radar device according to claim 2, wherein the pulse sequence is Golay code and
    wherein the correlator adds values corresponding to Π/2 and Π phase rotation respectively to a multiplication constant in a first stage and a multiplication constant in a second stage in a Golay correlator.

7. The pulse radar device according to claim 1, wherein
    the pulse sequence generator further generates a third sub-pulse sequence in reverse order of the first sub-pulse sequence and a fourth sub-pulse sequence in reverse order of the second sub-pulse sequence, and
    repetitively outputs four pulses generated from the first sub-pulse sequence, the second sub-pulse sequence, the third sub-pulse sequence, and the fourth sub-pulse sequence, while changing an order of the four pulses, and wherein the first phase rotator provides the phase rotation for every set of the four pulses.

8. The pulse radar device according to claim 1, wherein the pulse sequence generator further generates a third sub-pulse sequence in reverse order of the first sub-pulse sequence and a fourth sub-pulse sequence in reverse order of the second sub-pulse sequence and repetitively outputs four pulses generated from the first sub-pulse sequence, the second sub-pulse sequence, the third sub-pulse sequence, and the fourth sub-pulse sequence, while changing an order of the four pulses, and wherein the first phase rotator provides the same amount of the phase rotation for first two pulses in the first sub-pulse sequence and for the second sub-pulse sequence and for second two pulses in the third sub-pulse sequence and the fourth sub-pulse sequence.

9. A control method comprising:

a pulse sequence generating step of generating a pulse sequence using two sub-pulse sequences, which are complementary codes and satisfy constraint conditions, the two sub-pulse sequences including a first sub-pulse sequence and a second sub-pulse sequence and the constraint conditions including:

(i) a sum of a total of odd-numbered terms of correlation calculation value between the first sub-pulse sequence and the first sub-pulse sequence having a specified timing deviation and a total of odd-numbered terms of correlation calculation value between the second sub-pulse sequence and the second sub-pulse sequence having the specified timing deviation is zero, and (ii) a sum of a total of even-numbered terms of the correlation calculation value between the first sub-pulse sequence and the first sub-pulse sequence having the specified timing deviation and a total of even-numbered terms of correlation calculation value between the second sub-pulse sequence and the second sub-pulse sequence having the specified timing deviation is zero;

a $\Pi/2$-BPSK modulating step of generating modulation signals resultant from $\Pi/2$-BPSK modulation of the first sub-pulse sequence and the second sub-pulses sequence;

a first phase rotating step of applying phase rotation by a first phase to the modulation signals for every specified number of pulses; and a radio transmitting step of transmitting the modulation signals having undergone the phase rotation.

* * * * *